(12) United States Patent
Branner

(10) Patent No.: US 7,572,370 B2
(45) Date of Patent: Aug. 11, 2009

(54) INSTALLATION FOR THE MECHANICAL PURIFICATION OF LIQUIDS, AND METHOD FOR SEPARATING SUSPENDED MATTER

(75) Inventor: Wolfgang Branner, Berching (DE)

(73) Assignee: Hans Huber AG Maschinen-und Anlagenbau, Berching (DE)

( * ) Notice: Subject to any disclaimer, the term of this patent is extended or adjusted under 35 U.S.C. 154(b) by 129 days.

(21) Appl. No.: 11/576,154

(22) PCT Filed: Jul. 5, 2005

(86) PCT No.: PCT/EP2005/053182

§ 371 (c)(1), (2), (4) Date: Mar. 28, 2007

(87) PCT Pub. No.: WO2006/037669

PCT Pub. Date: Apr. 13, 2006

(65) Prior Publication Data

US 2008/0251437 A1    Oct. 16, 2008

(30) Foreign Application Priority Data

Oct. 1, 2004 (DE) .................. 10 2004 048 369
Dec. 3, 2004 (DE) .................. 10 2004 058 421

(51) Int. Cl.
*E03F 5/14* (2006.01)
(52) U.S. Cl. ............... 210/220; 210/521; 210/523; 210/524; 210/525
(58) Field of Classification Search ............ 210/220, 210/258, 259, 521, 523, 524, 525, 532.1
See application file for complete search history.

(56) References Cited

U.S. PATENT DOCUMENTS 2,228,852 A * 1/1941 Shafer .................. 210/524

(Continued)

FOREIGN PATENT DOCUMENTS

DE    2444241    4/1976

(Continued)

OTHER PUBLICATIONS

Einsatz belüfteter Sandfänge auf Kläranlagen, H. Patt, Sep. 1996.

(Continued)

*Primary Examiner*—Christopher Upton
(74) *Attorney, Agent, or Firm*—Dority & Manning, P.A.

(57) ABSTRACT

The invention relates to an installation for the mechanical purification of liquids, said installation comprising a container for separating suspended matter, and a transporting device for transporting the suspended matter to a discharge point. Said container comprising an inlet and an outlet for the liquid. A collecting chamber for suspended matter is formed in the bottom part of the container. The container for separating the suspended matter comprises at least two other chambers, at least one being embodied as a ventilated chamber and at least one as a non-ventilated chamber. The invention also relates to a method for separating suspended matter from liquids in a container comprising an inlet and an outlet for the liquid, and a collecting chamber for suspended matter in the bottom part thereof. According to said method, the suspended matter is separated in a multi-stage manner. At least one stage is a ventilated stage and at least one other stage a non-ventilated stage.

17 Claims, 2 Drawing Sheets

U.S. PATENT DOCUMENTS

| | | | | |
|---|---|---|---|---|
| 2,425,932 | A * | 8/1947 | Green | 210/524 |
| 2,678,912 | A * | 5/1954 | Kalinske et al. | 210/523 |
| 3,215,276 | A * | 11/1965 | Lind et al. | 210/220 |
| 3,297,567 | A * | 1/1967 | Tapleshay | 210/220 |
| 3,710,941 | A * | 1/1973 | Brociner | 210/220 |
| 4,940,539 | A | 7/1990 | Weber | |
| 5,061,369 | A | 10/1991 | Romero et al. | |
| 5,558,764 | A * | 9/1996 | Romo | 210/220 |
| 5,587,067 | A * | 12/1996 | Love | 210/202 |
| 6,491,830 | B1 * | 12/2002 | Batten et al. | 210/521 |
| 6,551,516 | B1 * | 4/2003 | Castleberry | 210/525 |
| 6,733,663 | B1 * | 5/2004 | Simon et al. | 210/158 |
| 2004/0011738 | A1 | 1/2004 | Albertson | |
| 2005/0035056 | A1 * | 2/2005 | Wilcher et al. | 210/521 |

FOREIGN PATENT DOCUMENTS

| | | |
|---|---|---|
| DE | 2525550 | 12/1976 |
| DE | 2832277 C2 | 1/1980 |
| DE | 3207658 A1 | 9/1983 |
| DE | 3920196 A1 | 1/1991 |
| DE | 4121392 A1 | 1/1993 |
| DE | 4409216 A1 | 9/1995 |
| DE | 4409692 A1 | 9/1995 |
| DE | 4415858 A1 | 11/1995 |
| DE | 19501034 C2 | 7/1996 |
| DE | 29620825 U1 | 3/1997 |
| DE | 19758038 A1 | 7/1999 |
| DE | 19850320 C2 | 5/2000 |
| DE | 19953961 A1 | 5/2001 |
| WO | 8300097 | 1/1983 |

OTHER PUBLICATIONS

Ein Beitrag zur Gestaltung belüfteter Sandfänge, A. Stein, Apr. 1992.
German Patent Office Search Report, May 23, 2005.
PCT Search Report, Nov. 4, 2005.
International Preliminary Examination Report, May 9, 2007.

* cited by examiner

INSTALLATION FOR THE MECHANICAL PURIFICATION OF LIQUIDS, AND METHOD FOR SEPARATING SUSPENDED MATTER

FIELD OF THE INVENTION

The present invention relates to an installation for the mechanical purification of liquids, especially sewage, with a container comprising an inlet and an outlet for the liquid and a collection space in the area of a bottom part for suspended matter. The installation comprises an apparatus for separating suspended matter from the liquid, a transport conveyor apparatus for the suspended matter as well as an apparatus for discharging the suspended matter. The invention furthermore relates to a process for the separation of suspended matter from liquids in a container.

BACKGROUND

Such installations are used in the purification of sewage in sewage treatment plants. So-called suspended matter, primarily sands and other mineral substances, are also contained in sewage in addition to organic contents. These inorganic substances can not be converted in the biological sewage treatment and can have a disadvantageous effect on the operational safety of sewage treatment plants and sludge treatment apparatuses. A separation of the sands and other mineral substances also carried along in the sewage from organic substances is therefore necessary. In sewage treatment plants the sewage is first conducted through a rake or a sieve that retains coarse contaminating substances. The sand entrained in the sewage is subsequently separated in sand trap installations by sedimentation. To this end non-aerated sand trap installations and aerated sand traps are known in addition to circular sand trap installations.

The non-aerated long sand trap consisting substantially of an elongated trough through which the flow passes horizontally is primarily used in fairly large sewage treatment plants. Its cross section can be rectangular or trapezoidal. The setting of an appropriate flow speed causes the entrained sand to settle on the bottom part while the specifically lighter organic substances are held suspended by the flow and washed away. Consequently, the sand trap must have an appropriate length. This design of a sand trap installation has the disadvantage that organic components also settle in addition to the mineral components. For example, a separation of fat is not possible with these installations. In particular, it is, however, difficult in non-aerated long sand trap installations to maintain a flow speed that is independent from the inflowing amount of water. The separation performance of a non-aerated longitudinal sand trap is therefore heavily dependent on the amount of inflow.

An improved separation between organic and inorganic substances independent of the inflow could be achieved by using aerated sand traps. In this case the settling of organic substances is limited by a uniform circulating flow. The blowing of air in the vicinity of the bottom part generates a rolling flow in the sewage so that a circumferential speed of the sewage that is advantageous for the settling of suspended matter is achieved independently of the inflow on the bottom part of the basin. In addition, a fat chamber can be arranged in aerated sand trap installations that is separated from the sand trap by a slotted separating wall. Also, the greatest part of the fatty components can be separated by the floating action of the aeration. The settling of organic substances can be largely avoided and a constant separating performance independent of the inflow could be achieved by aerated sand traps. However, the turbulences produced by the aeration also hold sand in addition to the organic substances in a suspended state so that the retention in particular of fine sands becomes worse with an increasing charging of air.

The present invention therefore addresses the problem of achieving a good separation of mineral particles of all grain sizes independently of the inflow.

SUMMARY

This problem is solved with an installation for the mechanical purification of liquids as well as with a process for the separation of suspended matter in accordance with aspects of the invention. Additional objects and advantages of the invention will be set forth in part in the following description, or may be obvious from the description, or may be learned through practice of the invention.

An installation for the mechanical purification of liquids comprises a container for the separation of suspended matter as well as a transport conveyor apparatus for transporting the suspended matter to a discharge point. The container comprises an inlet and an outlet for the liquid. A collection space for suspended matter is formed in the container in the area of a bottom part. In order to solve the problem, the container for the separation of suspended matter consists of at least two chambers, at least one of which chambers is designed as an aerated chamber and at least one as a non-aerated chamber. The arranging of an aerated chamber achieves a separation performance that is independent of the inflow into the installation. A settling of organic components that are to be supplied to the biological purification is also largely avoided by the aeration. In a non-aerated chamber, even rather fine sands can be well-settled so that an installation in accordance with the invention has a very high separation performance. In addition, such an installation also makes possible the separation and discharge of fats, that should also not pass into the biological clarification process.

A particularly advantageous embodiment of the invention provides that the liquid substantially flows through the non-aerated chambers of the container for the separation of suspended matter from the bottom upward. The path that the particles must traverse until they can settle can be considerably reduced by the incoming flow from below. The construction length of the installation is therefore largely irrelevant for the separation performance so that such an installation can be designed to be significantly shorter in comparison to the state of the art.

In a preferred embodiment of the invention, the aerated and the non-aerated chambers are separated from each other by a dividing wall comprising an opening for the liquid.

A particularly advantageous embodiment of the invention provides that an aerated chamber is arranged in front of a non-aerated chamber in the direction of flow. In this case the sewage in the aerated chamber is put into a circulating flow in such a manner that the organic components of the sewage are held suspended. The dividing wall comprises an opening in its lower area in this arrangement so that the water roll is introduced into the non-aerated area from below. The turbulence produced by the aeration rapidly decays in this arrangement. It is especially advantageous in this case if a guide apparatus for the liquid for evening out the upward flow is arranged on the dividing wall for the aerated and the non-aerated chambers. The guide apparatus preferably extends in the longitudinal direction of the non-aerated chamber so that a uniform upward flow is achieved over the entire length of the non-aerated chamber.

Another advantageous embodiment of the invention provides that a non-aerated chamber is arranged in front of an aerated chamber in the direction of flow. As a result of this arrangement the flow-off of the purified sewage can be designed in an especially simple manner. A guide apparatus for the liquid is advantageously arranged in this instance on the non-aerated chamber on the inlet side in order to achieve an upward flow. The sewage can be introduced via the guide apparatus into the non-aerated chamber on the front end and in a depth favorable for the settling.

In order to be able to remove floating matter, especially fats, from the sewage, it is advantageous if the container for separating suspended matter comprises a fat trap chamber. As a result, even fats that have a disturbing effect on the biological sewage purification process can be removed from the sewage.

A further development of the invention suggests that the container for the separation of suspended matter comprises an overflow pipe on the outlet side. A low flow rate can be obtained by the discharge via an overflow pipe if the non-aerated part of the installation is arranged after the aerated part, so that the settling of particles in the non-aerated part is not hindered.

Another advantageous further development of the invention is characterized in that the container for the separation of suspended matter comprises an emergency diversion channel. This makes it possible to circumvent the installation, e.g., for purposes of maintenance. Also, the load can be removed from the installation in the case of inflows that are too high by the emergency diversion channel.

The installation may have a transport conveyor apparatus for the suspended matter that preferably comprises a removal worm that is advantageously arranged in the collection space for the suspended matter. This can evacuate the sand trap material in an especially simple manner.

It also proved to be especially advantageous if an apparatus for the separation of floating and suspended matter is associated with the container for the separation of suspended matter, so that the subsequent separation of suspended matter can take place in an especially effective manner. The apparatus for the separation of floating and suspended material is preferably arranged in the container. An installation in accordance with the invention can be designed to be especially compact as a consequence thereof, so that it is excellently suited for being used even in fairly small sewage treatment plants. As a result, the length of the entire installation can be significantly reduced.

It is furthermore advantageous if the apparatus for the separation of floating and suspended matter is a rake system or sieve system. If the rake system or sieve system is designed as a system driven in a rotating manner an especially space-saving arrangement in the container is possible. It is especially advantageous if the rake system or sieve system dewaters the rake material with the discharge.

In another advantageous embodiment of the invention, the apparatus for the separation of floating and suspended matter comprises an overflow. In the case of a high accumulation of water or disturbances in the sieve apparatus, the water can nevertheless be supplied to the apparatus for the separation of suspended matter as a result. It is especially advantageous in this connection if a rake for the retention of coarse matter is arranged on the overflow. The sewage can then be supplied to the separation of suspended matter while circumventing the rake or sieve system. An excessive charging of coarse matter is nevertheless avoided.

In addition, it is especially advantageous if the installation comprises a hydraulic gradient. This makes it possible for the flow to pass through the installation without additional apparatuses for the generation of flow.

An advantageous embodiment of the invention provides that the discharge point for the suspended matter is arranged on the runoff side. An additional apparatus for the washing of sand can be arranged as a result in an especially favorable and constructively simple manner. It is also advantageous if the discharge point for the suspended matter is arranged on the inlet side or in the middle. Especially in the case of small sand trap installations and compact installations, an apparatus for discharging the suspended matter can be integrated into the container in a space-saving manner. Moreover, the discharge counter to the direction of flow brings about a washing out of any separated organic matter from the suspended matter.

In another advantageous further development of the invention an apparatus for discharging the suspended matter, especially a transport worm or classifying worm, is arranged at the discharge point. As a result thereof, the separated and dewatered sand can be discharged and removed.

A further development of the invention suggests that a connecting line is arranged between the discharge point and the container outlet. An aeration apparatus is associated with the connecting line so that any separated organic matter is forced up and caught by the suction of the liquid running off.

In addition, it is advantageous if a sand-washing apparatus is associated with the apparatus for discharging the suspended matter.

In a process in accordance with the invention for the separation of suspended matter from liquids, the separation of the suspended matter takes place in a multistage manner in a container. At least one of the two stages here is designed as an aerated stage and at least one other stage as a non-aerated stage. The container, that comprises an inlet and an outlet for the liquid as well as a collection space for suspended matter in the area of the bottom part, is subdivided to this end into at least two chambers. A constant separation performance that is independent from the inflow into the installation can be achieved with such a process, yet even rather fine sands are reliably deposited.

It proved to be especially advantageous if the liquid flows through the container from the bottom upward in a non-aerated stage. The low introduction location of the liquid brings about a short sinking time of the particles so that they can be deposited in a particularly reliable manner.

It is also advantageous if the liquid successively flows through an aerated and a non-aerated stage. Turbulence caused by the aeration can rapidly decay in this arrangement.

Other advantages of the invention are described in conjunction with the following exemplary embodiments.

DESCRIPTION

Figure 1:
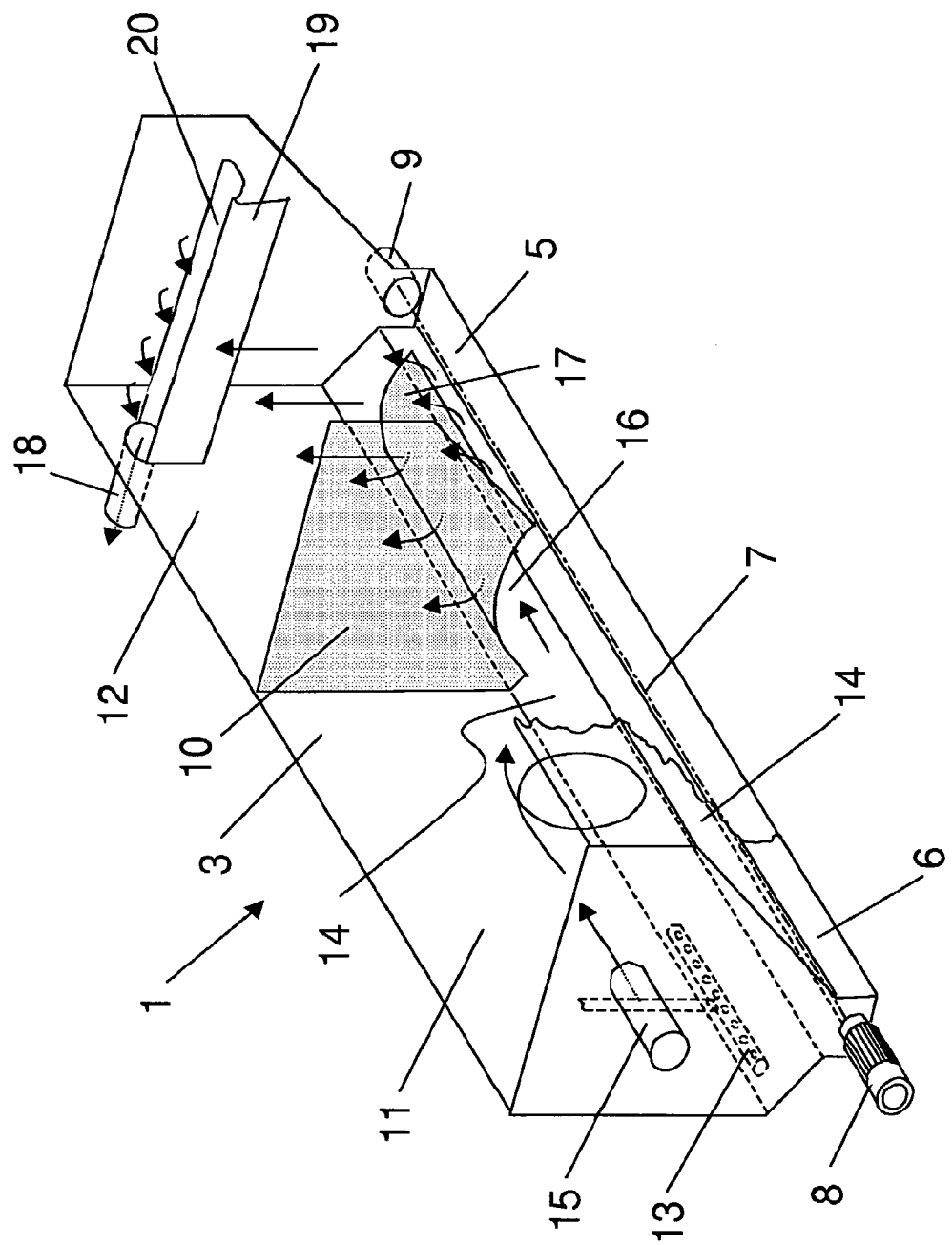
FIG. 1 shows a schematic view of an installation in accordance with the invention with an apparatus for the separation of suspended matter as well as a corresponding process.

Reference will now be made to embodiments of the invention, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the invention include these and other modifications and variations of the embodiments described herein.

FIG. 1 schematically shows an exemplary installation 1 in accordance with the invention for the mechanical purification of liquids. Installation 1 comprises a container 3 for the separation of suspended matter. Container 3 has a substantially trapezoidal cross section in the example shown that is favorable for the separation of suspended matter. A collection space 6 for the suspended matter is formed in the area of a bottom part 5 of container 3. A transport conveyor apparatus 7 is arranged in collection space 6 and is indicated here in a dotted line. Transport conveyor apparatus 7 is driven by motor 8 and transports the separated suspended matter to discharge point 9. Container 3 is subdivided by dividing wall 10 into two chambers 11, 12. An aeration apparatus 13 is arranged in one of chambers 11, 12 so that this chamber 11 can be operated as an aerated sand trap.

The liquid to be treated, especially sewage, flows through inlet 15 in the direction of the arrow into first chamber 11 of container 3. Air is blown in via aeration apparatus 13 on one side of container 3. This generates a rolling flow in a known manner in the flowing liquid, which flow is independent of the inflow. As a result thereof, organic matter contained in the sewage can be held suspended and flows off with the liquid. In contrast thereto, mineral particles settle on settling surfaces 14. The sewage flows through opening 16 in the lower area of dividing wall 10 into second chamber 12 designed as a non-aerated sand trap. The flow passes through non-aerated chamber 12 from below and flows upward in the chamber, as indicated by the flow lines in FIG. 1. As long as the upward speed of the flowing liquid is less than the sinking speed of the particles the sands can be deposited on settling surfaces 14. The lighter organic matter contained in the sewage remains suspended and is transported upward together with the flowing liquid. The low introduction into chamber 12 achieves shorter paths to settling and therewith shorter sinking times so that the settling of the sands takes place in an especially reliable manner. Even sands with rather small grain sizes can be readily settled. In order to achieve a uniform upward flow in chamber 12, a guide apparatus 17 for the liquid is arranged on dividing wall 10.

An immersion wall 19 can be arranged in front of outlet 18 in order to prevent the discharge of floating matter and to make the flow uniform. In order to avoid an elevation of the flow rate, the discharge of the liquid takes place via overflow pipe 20 transversely arranged in container 3 in the present example. However, an arrangement in the longitudinal direction is also possible. Overflow pipe 20 or rather outlet 18 are arranged in such a manner that a hydraulic gradient results in installation 1.

An aerated chamber 11 is arranged in front of a non-aerated chamber 12 in the example shown; however, it is also possible to arrange chamber 11 as a second chamber or to arrange several aerated or non-aerated chambers in series. If an aerated chamber 11 is arranged first, the floating matter, in particular fats, is retained especially well and the settling of the suspended matter in non-aerated chamber 12 takes place in an especially effective manner.

The arrangement of an aerated sand trap and of a non-aerated sand trap in a container 3 makes possible an especially short length of installation 1 with an elevated separation performance. Such an installation can therefore also be very well used in rather small the sewage treatment plants; such an installation can also be designed in an especially advantageous manner as a compact installation.

Figure 2:
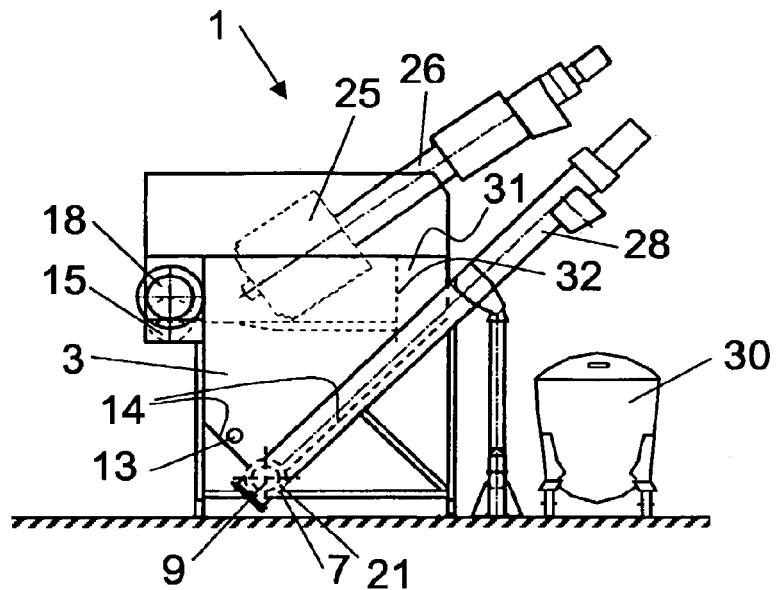
FIG. 2 shows an installation in accordance with the invention for the purification of liquids in a lateral view.

FIG. 2 shows an installation 1 in accordance with the invention for the purification of liquids in a side view. In the embodiment shown here an apparatus 25 for the separation of floating and suspended matter is arranged in container 3. The sewage passes via inlet 15 into container 3 while coarse contaminants are retained in apparatus 25 for the separation of floating and suspended matter. An especially short length of installation 1 can be achieved by the arrangement of apparatus 25 in container 3. Apparatus 25 is designed as a sieve system here. The raked matter dewaters in this instance in standpipe 26 and can be discharged into a ready container 30. The suspended matter settled on settling surfaces 14 is collected in collection space 6, where it is supplied by removal worm 21 to discharge point 9. In the example shown here a conveyor worm 28 for discharging the suspended matter is arranged at discharge point 9. The separated suspended matter is also discharged into container 30; however, it can be rejected into a downstream apparatus for sand washing. A fat trap chamber 29 is formed on container 3 for the separation of fats. Fat trap chamber 29 is separated from container 3 by slotted immersion wall 32. The suspended matter is forced up by the floatation effect of the air blown into aerated chamber 11 and subsequently collected in fat trap chamber 29.

Figure 3:
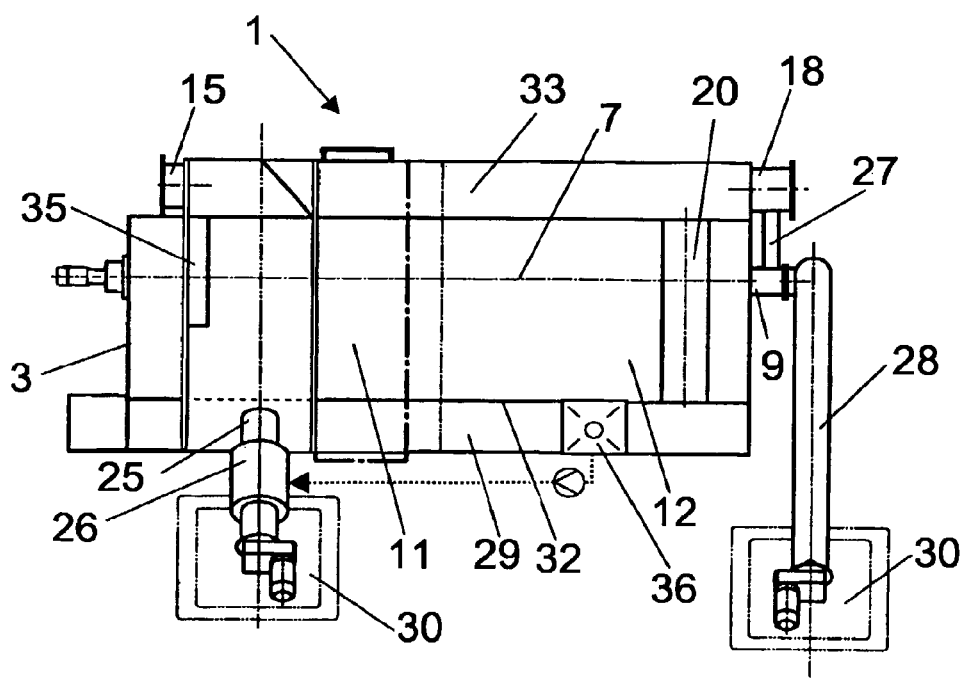
FIG. 3 shows an installation in accordance with the invention for the purification of liquids in a top view.

The separated fat can be conveyed by a compulsory removal device (not shown here) into a pump receiver (collecting main) 36 (FIG. 3) and subsequently supplied to the rake matter in apparatus 25 for the separation of floating and suspended matter. The discharge of the fat takes place together with the rake matter so that rotting processes due to non-removed fat are excluded. Apparatus 25 for the separation of floating and suspended matter comprises overflow 35. As a result thereof, the operating safety of installation 1 can be ensured even in the case of disturbances of installation 25, e.g., a clogged sieve. A rake can be arranged on overflow 35 so that at least rather coarse suspended matter can not pass into the installation.

The settled suspended matter is transported by transport conveyor apparatus 7, indicated here as a dotted line, in the direction of flow of the liquid through installation 1 to discharge point 9 at the end of container 3. As a result thereof, a sand-washing apparatus can be arranged in an especially simple and space-saving manner. However, it is also possible to transport the suspended matter counter to the direction of flow and remove it from container 3 on the inlet side. Any deposited organic matter can be put in suspension again by the transport counter to the direction of flow. Likewise, a connecting line 27 can be arranged between discharge point 9 and outlet 18 of the container, which line is associated with an aeration apparatus (not shown). The organic matter contained in the settled suspended matter is forced up by a purposeful aeration and is transported away with the liquid running off. In order to be able to empty installation 1, e.g., for maintenance purposes, emergency diversion channel 33 is arranged on container 3.

In the examples shown, an aerated chamber 11 is arranged in front of each non-aerated chamber 12. However, it is also possible to arrange in series several aerated chambers 11 or non-aerated chambers 12 and any combinations and in any sequence. If a non-aerated chamber 12 is arranged as the first chamber, it is advantageous to arrange a guide apparatus in this chamber 12 that introduces the liquid as low as possible into the chamber. This can achieve a uniform upward flow. If an aerated chamber 11 is arranged as a second or rather the last chamber, this facilitates the withdrawal of the liquid.

The arranging of an aerated chamber 11 and of a non-aerated chamber 12 in a container 3 makes it possible to achieve a length of installation 1 of only about 50% of traditional aerated or non-aerated sand traps. In particular, a very short length can be achieved when the flow passes through the non-aerated chamber 12 from the bottom upward. However, a combination of an aerated chamber 11 with a chamber designed as a flat sand trap is also possible.

The invention is not limited to the exemplary embodiments shown. Modifications within the scope of the patent claims are also included in the invention.

The invention claimed is:

1. An installation for mechanical purification of sewage liquid having suspended mailer therein, comprising:
   an elongated container having an inlet at a first longitudinal end and an outlet at an opposite longitudinal end through which the liquid to be purified is introduced and withdrawn from the container;
   a collection space defined along a bottom of said container in which the suspended matter is collected
   a transport conveyor disposed to convey the suspended matter from said collection space;
   said container comprising at least one aerated chamber and at least one non-aerated chamber sequentially arranged in the direction of flow of liquid through said container, said chambers separated by a wall within said container having an opening therethrough such that liquid flows completely through one of said chambers before flowing into the other of said chambers, and
   wherein the transport conveyor extends through the at least one aerated chamber and the at least one non-aerated chamber.

2. The installation as in claim 1, wherein said aerated chamber is disposed before said non-aerated chamber, and said opening in said wall is disposed such that liquid flow into said non-aerated chamber from said aerated chamber is directed to a bottom portion of said non-aerated chamber.

3. The installation as in claim 2, further comprising a guide member extending longitudinally from said opening in said wall along said bottom portion of said non-aerated chamber, said guide member generating upward flow of the liquid within said non-aerated chamber.

4. The installation as in claim 1, wherein said non-aerated chamber comprises an inlet at a bottom portion thereof, and further comprising a guide member extending longitudinally along a bottom portion of said non-aerated chamber to generate upward flow of the liquid in said non-aerated chamber.

5. The installation as in claim 1, wherein said non-aerated chamber is disposed before said aerated chamber within said container.

6. The installation as in claim 1, further comprising a fat trap chamber disposed within said container.

7. The installation as in claim 1, wherein said container further comprises an overflow pipe at said outlet end thereof, and an emergency diversion channel.

8. The installation as in claim 1, wherein said transport conveyor comprises a removal worm disposed along said collection space.

9. The installation as in claim 1, further comprising a separation device configured with said container to remove floating and remaining suspended matter from liquid within said container.

10. The installation as in claim 9, wherein said separation device comprises one of a rake or sieve system disposed within said container.

11. The installation as in claim 1, wherein said container further comprises an overflow having a rake for retention of coarse matter contained in any overflowing liquid from said container.

12. The installation as in claim 1, wherein said container is installed at an incline so as to generate a hydraulic gradient that generates liquid flow through said chambers.

13. The installation as in claim 1, further comprising a discharge for suspended matter from said collection space at said outlet end of said container.

14. The installation as in claim 1, further comprising a discharge for suspended matter from said collection space at a middle or further upstream portion of said container.

15. The installation as in claim 1, further comprising a discharge for suspended matter from said collection space, and an additional transport device at said discharge for removal of the suspended matter from said discharge.

16. The installation as in claim 1, further comprising a discharge for suspended matter from said collection space, and further comprising a sand washing apparatus disposed at said discharge.

17. An installation for mechanical purification of sewage liquid having suspended matter therein, comprising:
   an elongated container having an inlet at a first longitudinal end and an outlet at an opposite longitudinal end through which the liquid to be purified is introduced and withdrawn from the container;
   a collection space defined along a bottom of said container in which the suspended matter is collected
   a transport conveyor disposed to convey the suspended matter from said collection space;
   said container comprising at least one aerated chamber and at least one non-aerated chamber sequentially arranged in the direction of flow of liquid through said container, said chambers separated by a wall within said container having an opening therethrough such that liquid flows completely through one of said chambers before flowing into the other of said chambers; and
   further comprising a discharge for suspended matter from said collection space, and further comprising an aerated connecting line between said discharge and said container outlet.

* * * * *